(12) United States Patent
Flook

(10) Patent No.: US 8,816,032 B1
(45) Date of Patent: Aug. 26, 2014

(54) COPOLYMER OF CONJUGATED DIENE AND 1-VINYLCYCLOALKENE

(71) Applicant: Margaret McGuigan Flook, Cuyahoga Falls, OH (US)

(72) Inventor: Margaret McGuigan Flook, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/901,664

(22) Filed: May 24, 2013

(51) Int. Cl.
 - C08F 236/06 (2006.01)
 - C08F 4/52 (2006.01)
 - C08L 9/00 (2006.01)
 - B60C 1/00 (2006.01)
 - C07C 13/20 (2006.01)

(52) U.S. Cl.
 CPC .................... C08F 236/06 (2013.01)
 USPC ........... 526/308; 526/153; 526/164; 526/337; 524/554; 152/450

(58) Field of Classification Search
 CPC .......... C08F 4/52; C08F 236/045; C08L 9/00; B60C 1/00
 USPC .................. 526/164, 308, 337, 153; 524/554; 152/450
 See application file for complete search history.

(56) References Cited

U.S. PATENT DOCUMENTS

| | | | |
|---|---|---|---|
| 3,005,811 A | * | 10/1961 | Youngman ................. 526/169.1 |
| 4,113,930 A | | 9/1978 | Moczygemba |
| 4,179,480 A | | 12/1979 | Hsieh |
| 4,223,116 A | | 9/1980 | Moczygemba et al. |
| 8,071,800 B2 | | 12/2011 | Thuilliez et al. |

FOREIGN PATENT DOCUMENTS

| | | |
|---|---|---|
| GB | 1294167 A | 8/1970 |
| WO | 2011047021 A1 | 4/2011 |

OTHER PUBLICATIONS

Hara, et al., Cationic Polymerization of Cyclic Dienes X. Cationic Polymerization of 1-Vinylcyclohexene and 3-Methyl-1,3-pentadiene, Journal of Polymer Science Part A-1, 1971, 2933-2948, 9.

Longo, et al., Polymerization of 1-Vinylcyclohexene in the Presence of Group 4 Metallocenes—MAO Cataysts, Macromol. Rapid Commun. 1998, 19, 229-233.

* cited by examiner

Primary Examiner — Fred M Teskin
(74) Attorney, Agent, or Firm — John D. DeLong

(57) ABSTRACT

The present invention is directed to a copolymer derived from an acyclic conjugated diene monomer and a 1-vinylcycloalkene monomer of formula I

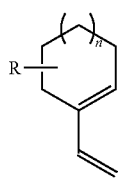

where n is an integer ranging from 0 to 4,
R is hydrogen or a linear or branched alkyl group of one to four carbon atoms, with the proviso that R may be appended at the 3 to (n+5) positions on the carbon ring.

19 Claims, 2 Drawing Sheets

COPOLYMER OF CONJUGATED DIENE AND 1-VINYLCYCLOALKENE

BACKGROUND OF THE INVENTION

With existing tire polymer and compound technology there is a tradeoff between desirable tire properties using commonly used tire polymers. The impending introduction of tire labeling regulations, along with increased competition make it more important than ever to produce tires that show high performance in every category. Tire properties are directly related to the material properties of the polymers used in the tire, which are in turn directly related to the glass transition temperature ($T_g$) of the chosen polymer. The most commonly used tire polymers are cis-polybutadiene, natural rubber, high-vinyl polybutadiene, and styrene/butadiene copolymers; these polymers are largely chosen for different roles in tire compounds based on their $T_g$. The traditional relationships between polymer $T_g$ and three important tire performance properties are outlined in the following table.

| Performance characteristic | Effect of increasing $T_g$ |
|---|---|
| Rolling resistance | worsened |
| Tread wear | worsened |
| Wet traction | improved |

This relationship between $T_g$, tan delta, and tire properties can also be visualized by examining the tan delta curves of various polymers. The value of tan delta at various temperatures is commonly used as an indicator of polymer performance, for example, the tan delta at 0° C. is an indicator of wet performance, while the tan delta at 60° C. is an indicator of rolling resistance. A tire with a higher tan delta at 0° C., such as an SBR, also exhibits a high tan delta at 60° C., making it a good choice for wet performance, but bad for rolling resistance. The opposite is true for cis-polybutadiene: the tan delta is low at both 0° C. and 60° C., making cis-PBD an excellent choice for improved rolling resistance but poor for wet traction performance.

There is a tradeoff between wet performance and the other two important characteristics, and it would seem at first glance that there is no way around this natural tradeoff. However, the shape of the tan delta/temperature curve also influences the polymer properties. Polymers of different composition exhibit different relationships between their glass transition temperatures and physical properties. An ideal polymer would exhibit a higher $T_g$ and a steeper tan delta/temperature slope, allowing tan delta to be as high as possible in the wet traction regime and as low as possible in the rolling resistance regime. This ideal polymer is not known among existing tire elastomers, therefore there is a need for new technology to prepare new classes of polymers with properties approaching those of this ideal polymer.

A largely unexplored class of polymers includes high-cis copolymers of dienes with other substituted comonomers beyond butadiene, isoprene, or styrene. One of the first reports of Ziegler/Natta copolymerization of butadiene (BD) with cyclohexadiene (CHD) is reported in GB 1294167. The catalyst in this system was an allyl complex of nickel, and the resulting highly cis copolymers contained between 5-25% incorporation of cyclic comonomers. Later reports of Ziegler/Natta copolymers of CHD and BD are given in U.S. Pat. No. 4,113,930, U.S. Pat. No. 4,179,480, and U.S. Pat. No. 4,223,116. The processes described in these patents employ transition metal catalysts, such as bis(1,5-cyclooctadiene)-nickel for the copolymerization of butadiene with cyclohexadiene. The copolymers described in these reports generally contained a high percentage of the cis-1,4 microstructure (>90%), however increasing the comonomer content of the feed led to reduced conversion and yield. In one report of this series, the authors found that the resulting cyclohexene/butadiene copolymers blended with SBR polymers showed improved green strength over the SBR alone.

More recently, WO 2011/04702 discloses a family of high-cis polybutadiene/cyclic diene copolymers of up to 5% CHD content. The publication discloses a variety of transition metal and lanthanide catalysts, however the representative examples focus on a nickel-based catalyst mixture.

The cyclohexene content of the CHD/BD copolymers described in WO 2011/04702 was only found to be approximately 60% of the expected content based on the feed ratios, and the polymer yield dropped noticeably with increased cyclohexadiene content. The glass transition temperatures, melting points, and PDI of the copolymers were not significantly changed from those of the butadiene homopolymers, likely due to the low incorporation of CHD.

Another diene, 1-vinylcyclohexene, remains relatively unexplored as a monomer in Ziegler/Natta polymerizations.

One example of Ziegler/Natta polymerization of 1-vinylcyclohexadiene was published in Longo et al., *Macromol. Rapid Commun.* 1998, 19, 229. Highly cis-1,4 polymer can be prepared from 1-vinylcyclohexene using a cyclopentadienyl titanium trichloride/MAO catalyst system. In this same report, 1-VCH was polymerized with ansa-metallocene zirconium compounds to form polymers of a 1,2-structure. Cationic polymerization of the same monomer was reported in Hara et al., *J. Polym. Sci. A* 1971, 9, 2933.

SUMMARY OF THE INVENTION

The present invention is directed to a copolymer derived from an acyclic conjugated diene monomer and a 1-vinylcycloalkene monomer of formula I

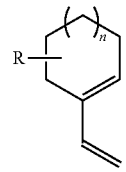

where n is an integer ranging from 0 to 4,
R is hydrogen or a linear or branched alkyl group of one to four carbon atoms, with the proviso that R may be appended at the 3 to (n+5) positions on the carbon ring.

DETAILED DESCRIPTION OF THE INVENTION

Figure 1:
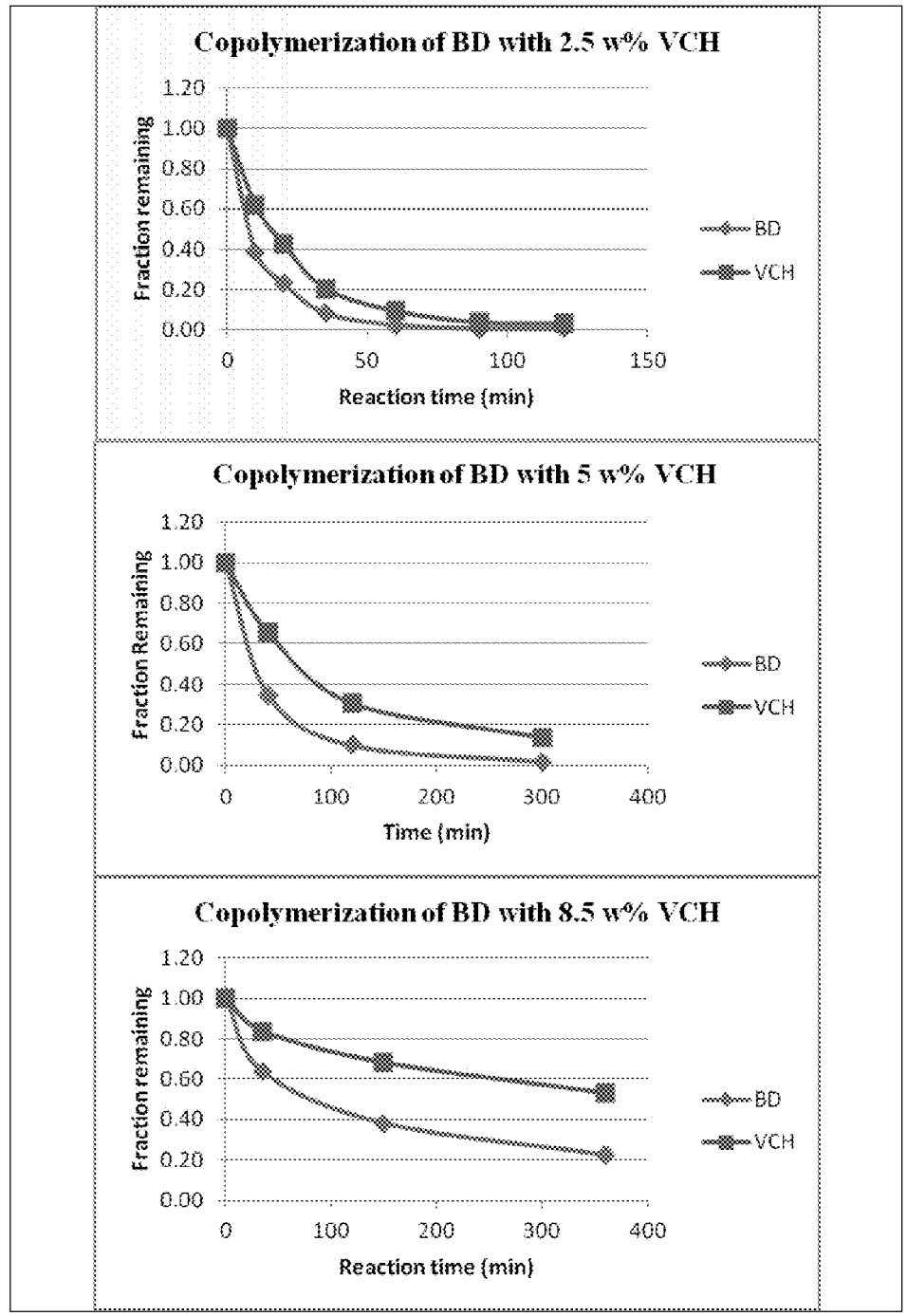
FIG. 1 shows plots of the fraction remaining of 1-vinylcyclohexene and butadiene after polymerization according to the invention.

There is disclosed a copolymer derived from an acyclic conjugated diene monomer and a 1-vinylcycloalkene monomer of formula I

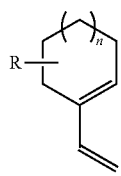

where n is an integer ranging from 0 to 4,

R is hydrogen or a linear or branched alkyl group of one to four carbon atoms, with the proviso that R may be appended at the 3 to (n+5) positions on the carbon ring. It is understood that this follows the conventional naming conventions for cyclic carbon structures, with the 1 position on the ring at the point of vinyl attachment and the 2 position on the ring at the adjacent double bonded carbon.

Copolymers of an acyclic conjugated diene and a 1-vinylcycloalkene prepared with Ziegler-Natta catalysts may possess two insertion modes for the units derived from 1-vinylcycloalkene, as illustrated in the following two structures using butadiene and 1-vinylcyclohexene as example monomers

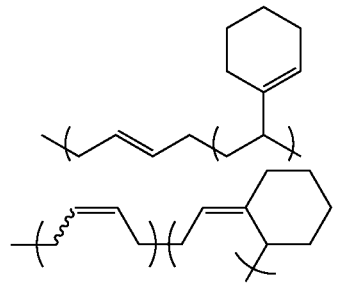

1,2 insertion  1,4 insertion

The repeat units derived from the comonomers may exhibit random distribution throughout the copolymer, however block copolymer or tapered copolymers are also possible structures of the polymers. The properties of the resulting copolymers may depend strongly both on the nature of the insertion of the comonomer and on the blockiness of the copolymer incorporation.

Significantly, the copolymers have a high 1,2 insertion of the 1-vinylcycloalkene monomer. In one embodiment, the copolymer comprises at least 2 percent by weight of repeat units with 1,2 insertion microstructure of units derived from the 1-vinylcycloalkene monomer, based on the total weight of the copolymer. In one embodiment, the copolymer comprises at least 4 percent by weight of repeat units with 1,2 insertion microstructure of units derived from the 1-vinylcycloalkene monomer, based on the total weight of the copolymer. In one embodiment, the copolymer has a microstructure wherein a major portion of units are derived from the 1-vinylcycloalkene monomer are of 1,4 insertion, and a minor portion of units are derived from the 1-vinylcylcloalkene monomer are of 1,2 insertion.

The copolymers have a high cis 1,4 microstructure of units derived from the acyclic conjugated diene monomer. In one embodiment, using butadiene as the acyclic conjugated diene monomer, the copolymer comprises at least 90 percent by weight of cis 1,4 microstructure content based on the weight of the polybutadiene content of the copolymer. In one embodiment, the copolymer comprises at least 95 percent by weight of cis 1,4 microstructure content based on the weight of the polybutadiene content of the copolymer.

Some representative examples of acyclic conjugated diene monomers that can be polymerized into the copolymer include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

Some representative 1-vinylcycloalkene monomers of formula I include 1-vinylcyclopentene, 1-vinylcyclohexene, 1-vinylcycloheptene, 1-vinylcyclooctene, and 1-vinylcyclononene, and C1 to C4 alkyl substituted versions thereof.

The copolymers of this invention are made via solution polymerization in the presence of a neodymium catalyst system. Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations that utilize the catalyst systems of this invention, there will normally be from 90 to 99 weight percent acyclic conjugated diene monomer and 1 to 10 weight percent of 1-vinylcycloalkene monomer in the polymerization medium. Such polymerization mediums are, of course, comprised of an organic solvent, the monomer, and the catalyst system. In some embodiments, the polymerization medium will contain from 75 to 99.5 weight percent acyclic conjugated diene monomer. In some embodiments, the polymerization medium will contain from 0.5 to 25 weight percent 1-vinylcycloalkene monomer.

The neodymium catalyst system used in the process of this invention is made by preforming three catalyst components. These components are (1) an organoaluminum compound, (2) a neodymium carboxylate, and (3) a dialkyl aluminum chloride. In making the neodymium catalyst system the neodymium carboxylate and the organoaluminum compound are first reacted together for 10 minutes to 30 minutes in the presence of isoprene to produce a neodymium-aluminum catalyst component. The neodymium carboxylate and the organoaluminum compound are preferable reacted for 12 minutes to 30 minutes and are more preferable reacted for 15 to 25 minutes in producing the neodymium-aluminum catalyst component.

The neodymium-aluminum catalyst component is then reacted with the dialkyl aluminum chloride for a period of at least 30 minutes to produce the neodymium catalyst system. The activity of the neodymium catalyst system normally improves as the time allowed for this step is increased up to about 24 hours. Greater catalyst activity is not normally attained by increasing the aging time over 24 hours. However, the catalyst system can be aged for much longer time periods before being used with out any detrimental results.

The neodymium catalyst system will typically be preformed at a temperature that is within the range of about 0° C. to about 100° C. The neodymium catalyst system will more typically be prepared at a temperature that is within the range of about 10° C. to about 60° C. The neodymium catalyst system will preferably be prepared at a temperature that is within the range of about 15° C. to about 30° C.

The organoaluminum compound contains at least one carbon to aluminum bond and can be represented by the structural formula:

in which $R^1$ is selected from the group consisting of alkyl (including cycloalkyl), alkoxy, aryl, alkaryl, arylalkyl radicals and hydrogen: $R^2$ is selected from the group consisting of alkyl (including cycloalkyl), aryl, alkaryl, arylalkyl radicals and hydrogen and $R^3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, tri-isobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to about 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization can be terminated by the addition of an alcohol or another protic source, such as water. Such a termination step results in the formation of a protic acid. However, it has been unexpectedly found that better color can be attained by utilizing an alkaline aqueous neutralizer solution to terminate the polymerization. Another advantage of using an alkaline aqueous neutralizer solution to terminate the polymerization is that no residual organic materials are added to the polymeric product.

Polymerization can be terminated by simply adding an alkaline aqueous neutralizer solution to the polymer cement. The amount of alkaline aqueous neutralizer solution added will typically be within the range of about 1 weight percent to about 50 weight percent based upon the weight of the polymer cement. More typically, the amount of the alkaline aqueous neutralizer solution added will be within the range of about 4 weight percent to about 35 weight percent based upon the weight of the polymer cement. Preferable, the amount of the alkaline aqueous neutralizer solution added will be within the range of about 5 weight percent to about 15 weight percent based upon the weight of the polymer cement.

The alkaline aqueous neutralizer solution will typically have a pH which is within the range of 7.1 to 9.5. The alkaline aqueous neutralizer solution will more typically have a pH which is within the range of 7.5 to 9.0, and will preferable have a pH that is within the range of 8.0 to 8.5. The alkaline aqueous neutralizer solution will generally be a solution of an inorganic base, such as a sodium carbonate, a potassium carbonate, a sodium bicarbonate, a potassium bicarbonate, a sodium phosphate, a potassium phosphate, and the like. For instance, the alkaline aqueous neutralizer solution can be a 0.25 weight percent solution of sodium bicarbonate in water. Since the alkaline aqueous neutralizer solution is not soluble with the polymer cement it is important to utilize a significant level of agitation to mix the alkaline aqueous neutralizer solution into throughout the polymer cement to terminate the polymerization. Since the alkaline aqueous neutralizer solution is not soluble in the polymer cement it will readily separate after agitation is discontinued.

The copolymer of the invention may be compounded into a rubber composition.

The rubber composition may optionally include, in addition to the copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard 2000 Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

The synthesis of 1-VCH was done as described in Scheme 1, using a modification of the procedure reported in Zhang et al., *J. Am. Chem. Soc.* 2006, 128, 54.

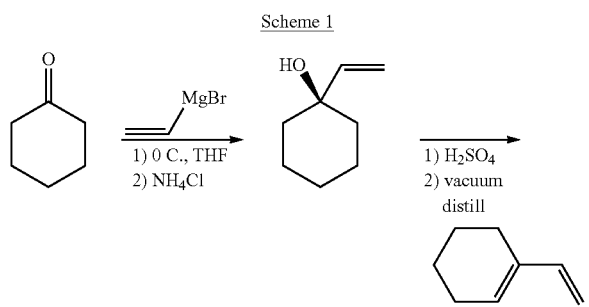

In a 1000 mL oven dried round bottom flask, 400 mL (0.4 mol, 1.3 eq) of vinylmagnesiumbromide (1.0 M in THF) was cooled to 0° C. under argon. 31.9 mL (0.308 mol) of cyclohexanone dissolved in an equal volume of THF was added dropwise to the solution and the reaction mixture was allowed to warm to room temperature. After full consumption of the starting materials was observed by gas chromatography, the reaction mixture was quenched with excess ammonium chloride aqueous solution. The resulting white cloudy mixture was filtered through celite, and all volatile components were removed by rotary evaporation. 100 mL of hexane were added to the resulting yellow oil, and the mixture was filtered again through celite. The hexane filtrate was used without further purification in the next step of the reaction.

The reaction mixture was cooled down to 0° C. in an ice bath and approximately 1.0 mL of concentrated sulfuric acid was added to the solution drop wise. The reaction was stirred vigorously for 5 hours at 0° C., until complete consumption of the starting material was observed by gas chromatography. After completion, the acid layer was allowed to settle and was separated from the organic layer. The organic layer was washed with aqueous sodium bicarbonate solution, followed by water and finally brine. The mixture was dried with magnesium sulfate, filtered, and volatiles were removed by rotary evaporation. The crude mixture was purified by vacuum distillation (75 mbar, 65° C.), 16.2 g of product was collected (49% overall yield in two steps). $^1$H NMR and GC analysis showed pure expected product.

Example 2

Copolymers of 1-vinylcyclohexene (1-VCH) were prepared by addition of 1-VCH to a 15% (w/w) solution of 1,3-butadiene (BD) in hexane, followed by addition of 0.2 mmphm of a preformed catalyst prepared from neodymium versatate, triisobutylaluminum, and diethylaluminum chloride (1:25:2.5). The reactions were monitored by gas chromatography, and after complete consumption of butadiene, were terminated with 10% BHT/isopropanol solution. There were no significant changes in molecular weight up to 10% comonomer loading, but a slight increase in PDI with higher comonomer loadings. GPC and DSC data for these polymers are presented in Table 1.

TABLE 1

| Comonomer | Loading w % | Tg (° C.) | Tm (° C.) | % crystallinity | Mn (x10$^3$) | PDI |
| --- | --- | --- | --- | --- | --- | --- |
| None | N/A | −103.22 | −8.1 | 73% | 281 | 2.5 |
| 1-VCH | 5 | −99.90 | −12.28 | 44% | 278 | 2.5 |
| 1-VCH | 10 | −97.28 | −16.38 | 37% | 254 | 3.4 |
| 1-VCH | 30 | −91.21 | −17.13 | 1% | 90 | 3.4 |

Plots of the fraction remaining of 1-vinylcyclohexene and butadiene are presented in FIG. 1. The second and third plots in FIG. 1 show the consumption of both 1-VCH and butadiene over time at 5 w % and 8.5 w % comonomer loading, respectively. One point that is made clear by examination of these plots is that the fraction of 1-VCH consumed at full butadiene consumption decreases with increasing comonomer loading. This can be better illustrated by examining the fraction of 1-VCH remaining at 80% butadiene consumption. An increase in the loading of 1-VCH leads to a decrease in the fraction of 1-VCH that is incorporated into the copolymer at 80% consumption of butadiene. This is an indication that the copolymers prepared with higher loadings are more highly tapered than those at lower loadings. This tapering effect is not entirely unexpected: the steric effect of the bulky substituents of 1-VCH is sure to overshadow any electrostatic effect, leading to a slower polymerization of 1-VCH as compared to BD.

Example 3

A homopolymer of 1-VCH was prepared following the procedure of Example 2, but through addition of a 10 fold increase in catalyst loading (Scheme 2). The homopolymer was found to be a glass with a $T_g$ of 97.5° C., and due to the large increase in catalyst loading, the molecular weight distribution was 4.9 (as opposed 2.2-2.5 usually found in BD homopolymerization).

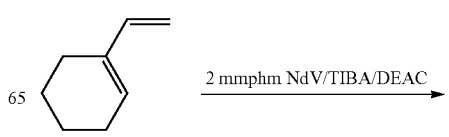

-continued

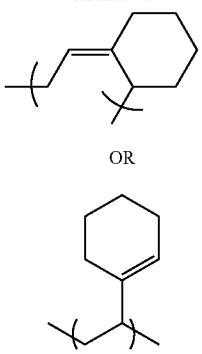

$T_g$ = 97.5° C., $M_n$ = 196K, PDI = 4.9

Example 4

Figure 2:
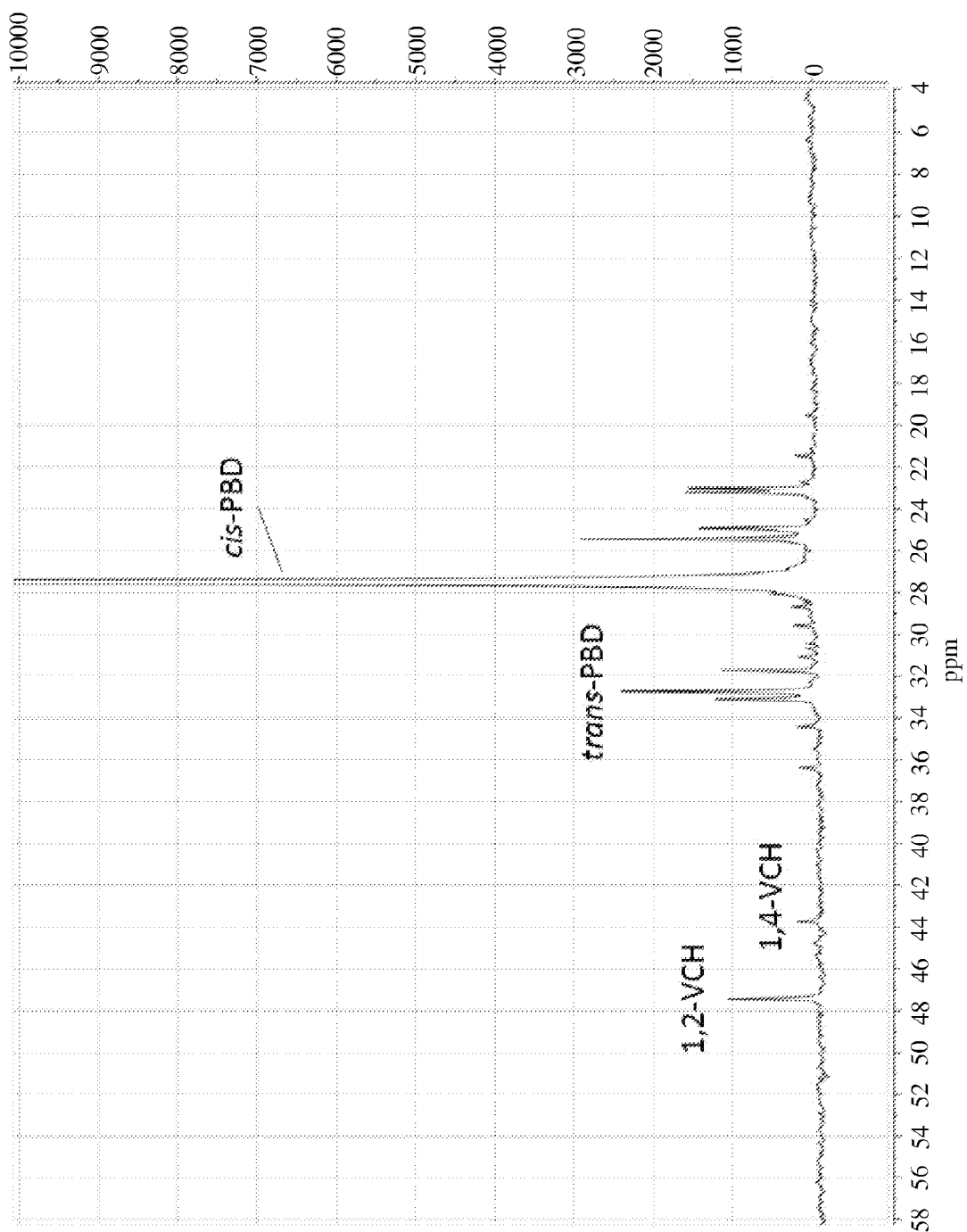
FIG. 2 is a $^{13}C$ NMR spectrum of a copolymer sample prepared with 10% 1-vinylcyclohexene loading.

To confirm the level of comonomer incorporation and to gain insight into the structure of the copolymer of Example 2, a $^{13}$C NMR spectrum was recorded of the copolymer sample prepared with 10% 1-VCH loading. The spectrum obtained from this polymer is displayed in FIG. 2, and the relevant data is presented in Table 2.

TABLE 2

| w % | w % of PBD portion | Assignment |
|---|---|---|
| 5.0 | | 1,2 VCH |
| 0.8 | | 1,4 VCH |
| 90.3 | 96 | Cis BD |
| 3.3 | 3.5 | Trans BD |
| 0.5 | 0.5 | Vinyl BD |

As expected, the incorporation of 1-VCH into this copolymer did not significantly alter the microstructure of the PBD portion of the copolymer, the cis content of the PBD region is still relatively high, and the vinyl content very low. One surprising result to come out of this NMR study is that the majority of the incorporated 1-VCH was found to be present in a 1,2-configuration, as opposed to a 1,4-configuration. 1,4-insertion was expected due to the fact that this catalyst system generally gives very low (≤0.5%) 1,2-butadiene insertion, and would logically follow that the comonomer would follow the same insertion pattern. This change in insertion pattern could be ascribed to the increased steric bulk of 1-vinylcyclohexene forcing the monomer to coordinate as a mono-olefin, giving 1,2-insertion.

What is claimed is:

1. A copolymer derived from 1,3-butadiene and a 1-vinylcycloalkene monomer of formula I

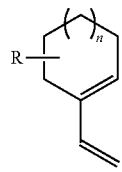

where n is an integer ranging from 0 to 4,
R is hydrogen or a linear or branched alkyl group of one to four carbon atoms, with the proviso that R may be appended at the 3 to (n+5) positions on the carbon ring.

2. The copolymer of claim 1, wherein the 1-vinylcycloalkene monomer of formula I is 1-vinylcyclohexene.

3. The copolymer of claim 1, wherein the copolymer comprises greater than 2 percent by weight of 1,2 insertion of units derived from the 1-vinylcycloalkene monomer.

4. The copolymer of claim 1, wherein the copolymer comprises greater than 4 percent by weight of 1,2 insertion of units derived from the 1-vinylcycloalkene monomer.

5. The copolymer of claim 1, wherein the major portion of units derived from the 1-vinylcycloalkene monomer are of 1,2 insertion, and a minor portion of units derived from the 1-vinylcylcloalkene monomer are of 1,4 insertion.

6. The copolymer of claim 1, comprising from 75 to 99.5 percent by weight of units derived from the acyclic conjugated diene monomer and from 0.5 to 25 percent by weight of units derived from the 1-vinylcycloalkene monomer of formula I.

7. The copolymer of claim 1, comprising from 90 to 99 percent by weight of units derived from the acyclic conjugated diene monomer and from 1 to 10 percent by weight of units derived from the 1-vinylcycloalkene monomer of formula I.

8. The copolymer of claim 1, comprising at least 90 percent by weight of cis 1,4 microstructure content based on the weight of the polybutadiene content of the copolymer.

9. The copolymer of claim 1, comprising at least 95 percent by weight of cis 1,4 microstructure content based on the weight of the polybutadiene content of the copolymer.

10. A rubber composition comprising the copolymer of claim 1.

11. A pneumatic tire comprising the rubber composition of claim 10.

12. A method making a copolymer, comprising the steps of polymerizing an acyclic conjugated diene monomer and a 1-vinylcycloalkene monomer of formula I

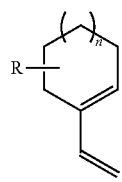

where n is an integer ranging from 0 to 4,
R is hydrogen or a linear or branched alkyl group of one to four carbon atoms, with the proviso that R may be appended at the 3 to (n+5) positions on the carbon ring;

in the presence of a lanthanide-based coordination polymerization catalyst.

13. The method of claim 12, wherein the lanthanide-based coordination polymerization catalyst is a neodymium based catalyst.

14. The method of claim 12, wherein the acyclic conjugated diene monomer is 1,3-butadiene.

15. The method of claim 12, wherein the 1-vinylcycloalkene monomer of formula I is 1-vinylcyclohexene.

16. The method of claim 12, wherein the resulting copolymer comprises greater than 2 percent by weight of 1,2 insertion of units derived from the 1-vinylcycloalkene monomer.

17. The method of claim 12, wherein the resulting copolymer comprises greater than 4 percent by weight of 1,2 insertion of units derived from the 1-vinylcycloalkene monomer.

18. The method of claim 12, wherein the total monomer comprises from 75 to 99.5 percent by weight of the acyclic conjugated diene monomer and from 0.5 to 25 percent by weight of the 1-vinylcycloalkene monomer of formula I.

19. The method of claim 14, wherein the resulting copolymer comprises at least 90 percent by weight of cis 1,4 microstructure content based on the weight of the polybutadiene content of the copolymer.

* * * * *